United States Patent Office 2,791,125
Patented May 7, 1957

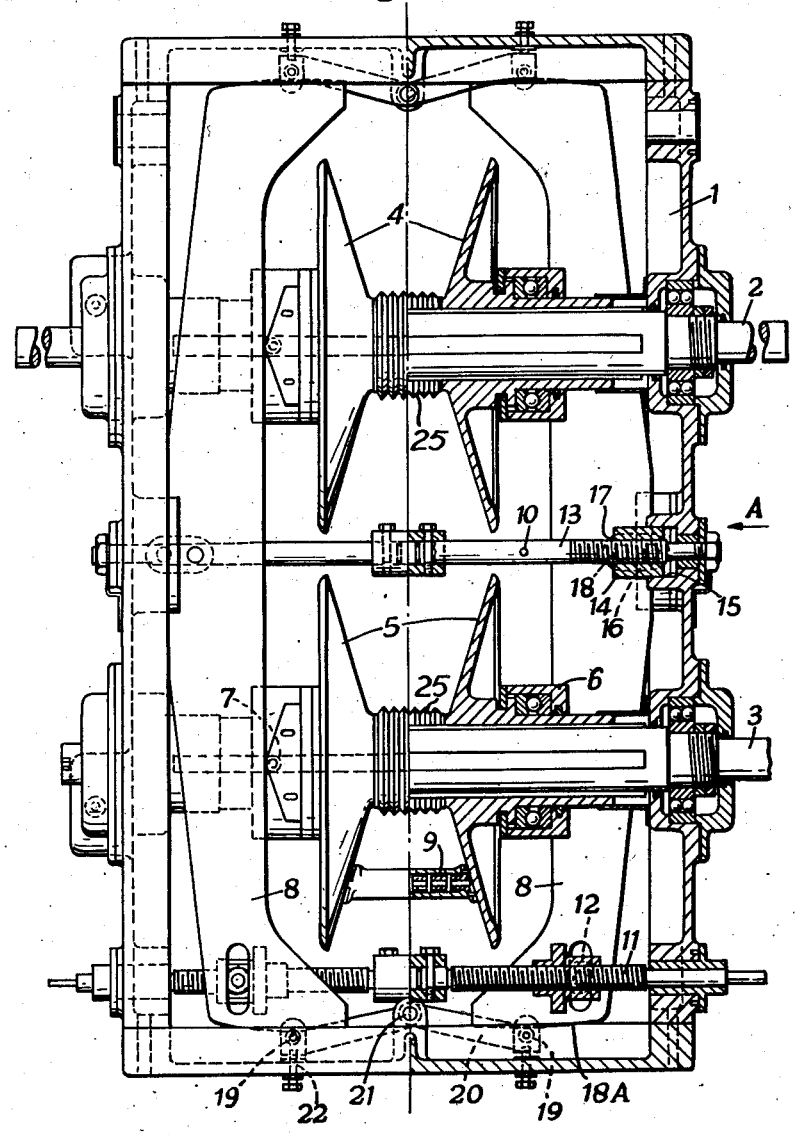

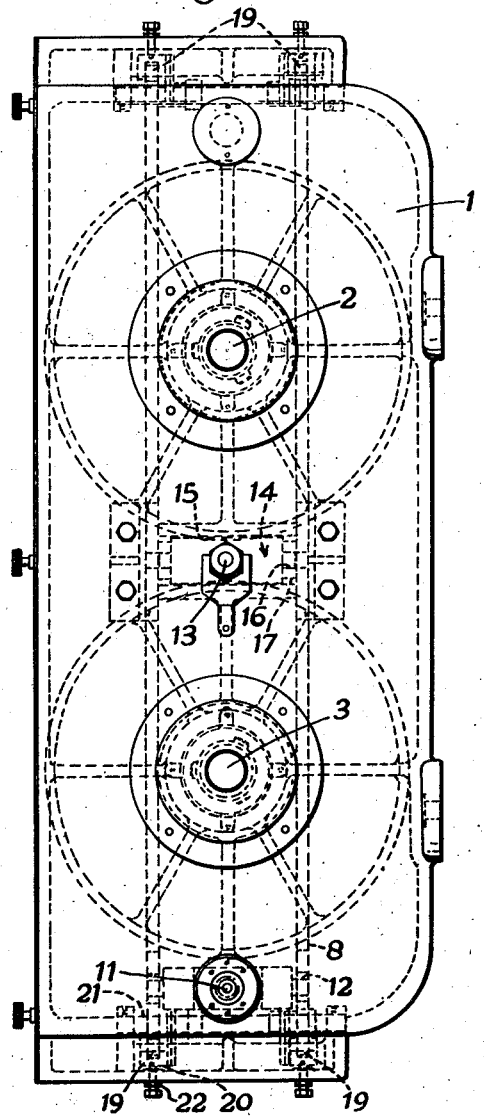

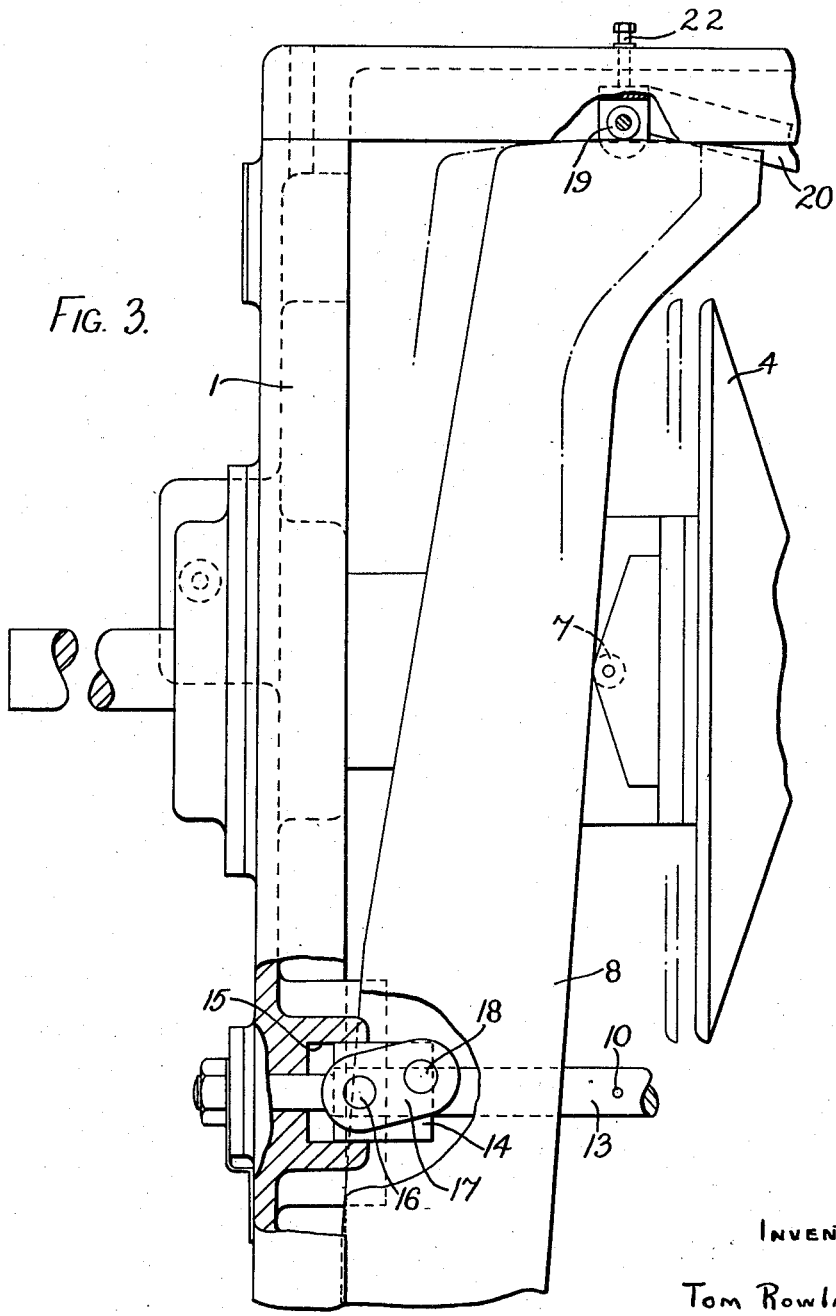

2,791,125

VARIABLE SPEED GEARING OF THE EXPANDING V PULLEY TYPE

Tom Rowlands, Deptford, London, England, assignor to Molins Machine Company, Limited, Deptford, London, England, a British company Application January 11, 1954, Serial No. 403,383

Claims priority, application Great Britain January 16, 1953

3 Claims. (Cl. 74—230.17)

This invention concerns improvements in or relating to variable speed gearing of the expanding V pulley type. More specifically, the gearing is of the well-known type comprising parallel driving and driven shafts, on each of which are mounted two coned elements (i. e. frusta of cones) which together form a V pulley, the pulleys on each shaft being adjustable by movement of the coned elements towards and away from one another, and a belt whose sides are shaped to fit the angles of the coned elements and serving to transmit motion from one pulley to the other. Movement to adjust the elements of the pulleys is effected by arms which are pivoted about midway between the gear shafts, the arms being arranged to press against the corresponding coned elements and close the elements of one pulley while the elements of the other pulley open under the pressure of the belt as the arms permit them to do so. As will be described in more detail later the pivots are subjected to very heavy stresses, sufficient at times to break or distort parts.

Variable speed gears of this type are in very large use and the present invention is concerned with this particular type of gear and has for an object to improve the mounting and operation of the adjusting arms. These features of the gear differ somewhat in detail in different makes of the gears.

According to the present invention there is provided a gear of the type referred to wherein the means for supporting the arms during their pivotal movement against the stresses set up by the work done in moving the cones and the belt to alter the gear ratio, consists in forming the ends of the arms to arcs and providing supporting means such as rollers, which lie in contact with the arcuate surfaces and so compel the arms to move in a path determined by the curvature of the arcs, thus relieving the pivots of any substantial stress.

The attached drawing shows a typical gear of the type referred to but modified according to the present invention. In the drawings:

Figure 1 is a sectional plan of the gear.

Figure 2 is an end elevation of Figure 1 looking in the direction of the arrow A, and Figure 3 is a fragment of Figure 1 drawn to a larger scale, partly broken away, and showing part of an operating arm in a different position.

Referring to the drawings, the gear is contained in a casing 1 in which are journalled a driving shaft 2 and a driven shaft 3. On the shaft 2 there are a pair of movable coned elements 4 and on the shaft 3 there are a similar pair 5. Each coned element is provided with a thrust washer device 6 and at the sides each such device is provided with a pair of small rollers 7. These rollers bear against arms 8 which are the adjusting arms of the gear. The belt is shown in section at 9 and it will be seen that it is a V type belt, but is built up with metal segments provided with friction pads at their ends as the particular gear under discussion is for a very large machine for making corrugated board. The point marked 10 is a centre about which certain arcs referred to later are described, but for the moment it will be seen that if the right-hand arm is swung about a centre approximately in this position the cones 4 and 5 will open and close respectively according to the direction of the swinging movement, and as both the arms move together the result will be that one of the pulleys will close and the other will open so that the gear ratio will alter as the belt shifts down the opened cone and moves up the closed cone. Between each pair of cones there may be provided a flexible accordion pleated tube 25 to exclude dirt from the shafts on which the cones slide. The swinging movements are effected by a screwed shaft 11 which can be rotated either manually, through suitable gearing, or by a motor according to circumstances. At 12 there is a pin and slot connection between a nut which travels on the screw 11 and one end of each operating arm so that as the screw is rotated the nuts move one way or the other along the shaft according to the direction of rotation and swing the arms to adjust the pulleys.

At the centre of the casing there is a bar 13 which is screwed at its ends and threaded into blocks 14 which are slidable in guides 15 formed in the casing. At each side of a block 14 is a pivot pin 16 and a pair of links 17 are attached to these pivots. The other ends of the links are attached by pivots 18 to the arms 8. The purpose of the slide 14 is to permit adjustment when the gear is being set up in the first place or if any alteration in adjustment is required when the gear is in service. Apart from this adjustment the axis of the pin 16 may be regarded as fixed so that the links 17 can swing about this axis and permit a little movement to the arms 8. The reason for this pivotal mounting of the arms is because the coned elements of each pulley do not move equal amounts for the different positions the belt takes up on the pulleys for different settings. At mid-gear when the two pulleys have identical settings and the transmission ratio is 1:1 the belt has a mean length equal to the mean circumference of the contact area on the pulleys plus twice the centre distance of the two shafts. It will be appreciated by those familiar with open belt drives that if the gear is shifted by moving the elements of each pulley by the same amount the belt length would not be correct.

This means that the arm movement cannot be a simple swinging movement about a fixed pivot because the relative movement of the cone members of one pulley cannot be the same as that of the members of the other pulley. For this reason the pivot 18 is made movable and the structure so far described is all substantially known.

In gears of this type as at present made it is customary to rely on the pivot, such as the pivot 18, to support the adjusting arm 8 as well as functioning as a pivot, but as large horse-powers are often transmitted by these gears the stress on the parts is so great that they become bent or broken.

In the present case there is provided means for supporting the arms during their pivotal movement against the stresses set up by the work done in moving the cones and the belt to alter the gear ratio. This means consists in forming the ends of the arms 8 to arcs 18A and providing supporting means such as rollers, which lie in contact with the arcuate surfaces and so compel the arms to move in a path determined by the curvature of the arcs, thus relieving the pivots 18 of any substantial stress.

As shown in Figure 1 the arcs referred to in the preceding paragraph are, for the right-hand arms 8, circular arcs struck about the centre 10. The arcs for the left-hand arms are struck from a similar centre at the left-hand side of the gear.

The arcuate surfaces 18A are supported by rollers 19 which are carried on links 20 pivoted at 21, and adjusting screws 22 are provided whereby the rollers can be adjusted to bring them into the desired contact with the arcuate surfaces of the ends of the arms.

In operation the arcuate surfaces roll on the rollers 19 but the links 17 also swing on the pivots 16 as the arms are shifted by the adjusting screw. The effect of the combined movement is to cause a bodily shift of each arm, the centre 10, Figure 1 moving slightly along the axis of the bar 13 to a position nearer to the neighbouring pivot 16. By this combined movement a true setting of the arms is obtained but the major part of the stress is borne by the rollers 19. In Figure 3 the arm 8 and coned element 4 are shown in full lines in one position and partly in chain lines in the position corresponding to that shown in Figure 1.

What I claim as my invention and desire to secure by Letters Patent is:

1. In a variable speed gearing of the expanding V pulley type comprising parallel driving and driven shafts, mounted for rotation in a casing, opposed conical elements on each of said shafts constituting a V pulley, a belt effecting a driving connection between said pulleys, and means for adjusting the spacing of the conical elements axially of the shafts to vary the driving ratio, the combination with an arm extending transversely of said shafts, of means interposed between one of the conical elements on each shaft and the arm to afford an axial thrust connection therebetween, whereby rocking of the arm effects displacement of the conical elements in opposite direction, means supporting the arm for rocking movement, said last named means comprising a pair of links pivoted to said arm and to normally fixed pivots on said casing, and a normally fixed bearing on said casing adjacent each end of the arm, the ends of the arm being formed to provide arcuate surfaces engaging said last named bearings, whereby the arm is permitted to rock by swinging movements of said links about the said normally fixed pivots and is guided in its rocking movement and supported against unwanted lateral displacement by said last named bearings, and control means for rocking the arm to vary the gearing ratio.

2. Variable speed gearing as claimed in claim 1 comprising a link pivoted to the casing at each end of said arm and on which said normally fixed bearings are mounted, and means for effecting adjustment of said links and the bearings thereon toward and away from said arcuate surfaces.

3. Variable speed gearing as claimed in claim 1 in which a pair of arms are provided, one on either side of said V pulleys, whereby both conical elements constituting each pulley may be concurrently displaced to vary the ratio.

References Cited in the file of this patent

UNITED STATES PATENTS

| | | |
|---|---|---|
| 1,486,704 | Vicars | Mar. 11, 1924 |
| 1,692,955 | Rowley | Nov. 27, 1928 |